United States Patent

Ryan

Patent Number: 6,159,280
Date of Patent: Dec. 12, 2000

[54] CUPRIC OXYCHLORIDE CEMENT FOODSERVICE FLOORING

[75] Inventor: William V. Ryan, Pittsburgh, Pa.

[73] Assignee: Hubbellite America, Inc., Pittsburgh, Pa.

[21] Appl. No.: 09/090,522

[22] Filed: Jun. 4, 1998

Related U.S. Application Data

[60] Provisional application No. 60/048,553, Jun. 4, 1997.

[51] Int. Cl.$^7$ .................................................. C04B 9/00
[52] U.S. Cl. ........................ 106/683; 106/685; 106/686; 106/688
[58] Field of Search ................................ 106/683, 685, 106/686, 688

[56] References Cited

U.S. PATENT DOCUMENTS

| | | |
|---|---|---|
| 1,634,505 | 7/1927 | McCaughey . |
| 2,058,984 | 10/1936 | Hubbell . |
| 2,058,985 | 10/1936 | Hubbell . |
| 2,058,987 | 10/1936 | Hubbell . |
| 2,126,191 | 8/1938 | Hubbell ................................ 106/688 |
| 2,231,123 | 2/1941 | Hubbell ................................ 106/688 |
| 2,321,522 | 6/1943 | Sands .................................... 106/686 |
| 2,351,641 | 6/1944 | Sohl et al. ........................... 106/688 |
| 2,450,513 | 10/1948 | Hubbell ................................ 106/688 |
| 2,462,030 | 2/1949 | Whitehead ........................... 106/688 |

*Primary Examiner*—Paul Marcantoni
*Attorney, Agent, or Firm*—Webb Ziesenheim Logsdon Orkin & Hanson, P.C.

[57] ABSTRACT

A cementitious material having improved resistance to water, increased strength, increased resistance to deteriorating processes and which is toxic to certain microorganisms and repellent to certain roach species, said material comprising on a dry mix basis, in % by weight, about 2% to 5% copper oxide, about 1% to 5% condensed silica fume, about 1.5% siloxane coated calcium hydroxide, about 53.5% to 60.5% dolomitic limestone and effective amounts of pigments and fillers.

2 Claims, No Drawings

CUPRIC OXYCHLORIDE CEMENT FOODSERVICE FLOORING

CROSS REFERENCE TO RELATED APPLICATION

This application claims the benefit of Provisional Application Ser. No. 60/048,553, filed Jun. 4, 1997, entitled "Cupric Oxychloride Cement Foodservice Flooring".

BACKGROUND OF THE INVENTION

1. Field of the Invention

This invention relates to a Sorel cement, particularly cupric oxychloride cement, and an improved process for making an institutional and commercial kitchen flooring thereof.

2. Description of the Prior Art

Reference is made to U.S. Pat. No. 1,634,505 to McGaughey and to U.S. Pat. Nos. 2,058,984; 2,058,985; 2,058,986; and 2,058,987, all to Hubbell. The disclosures of these patents are incorporated by reference herein. The object of this invention is to provide increased water resistance to this cement thus providing a flooring suitable for substantially wet spaces such as institutional and commercial kitchens. An object of this invention is to provide increased strength and to provide increased resistance to deteriorating processes. This invention has further for an object to provide a Sorel cement flooring, particularly cupric oxychloride cement, which is toxic to certain microorganisms and substantially repellent to common roach species. Still further this invention has as its object an improved process for making cupric oxychloride cement more economically than has heretofore been possible.

The McGaughey U.S. Pat. No. 1,634,505 proposes an oxychloride cement composition of approximately 20% partially calcined dolomite, 5% calcined magnesite and 75% fine aggregate (sand and asbestos). To this dry blend is added an 18–22° Baumé solution of flaked magnesium chloride and water to form the Sorel cement bond.

The Hubbell patents propose a cupric oxychloride cement composition of 20% plastic magnesia from partially calcined dolomite, 70% to 77% fine aggregate and 3% to 10% finely divided copper powder.

Both above-referenced patents acknowledge the inherent harmful effect of free lime (calcium oxide) being present in the composition at percentages above 2.5%. The Hubbell patents' addition of fmely divided copper provides a theoretical solution to the problem of excess free lime. As a practical matter, however, difficulties arise due to the substantial amounts of calcium oxide formed during the process of calcining dolomite. Therefore, it is not economically feasible to include the high percentage of copper necessary to negate the effect of the excess calcium oxide.

SUMMARY OF THE INVENTION

This invention proposes a cupric oxychloride cement composition, in percentage by weight, of about 35% calcined magnesite, 2% to 5% copper oxide, 1% to 5% condensed silica fume, about 1.5% siloxane coated calcium hydroxide and 53.5% to 60.5% dolomitic limestone, pigments and fillers.

The cement of the present invention may be utilized as a flooring which is not only economical, but also provides increased water resistance and increased resistance to deterioration. The cement of the present invention is also toxic to microorganisms and is repellent to common roach species.

DETAILED DESCRIPTION OF THE INVENTION

As noted above, the present invention discloses a cupric oxychloride cement composition of approximately 35% calcinated magnesite, 2% to 5% copper oxide, 1% to 5% condensed silica fume, approximately 1.5% siloxane coated calcium hydroxide and 53.5% to 60.5% dolomitic limestone, pigments and fillers. The fundamental differences between the present invention and the cited prior art are as follows:

1. By eliminating partially calcined dolomite as a source of magnesium oxide, the potential for uncontrolled amounts of free lime being present is greatly diminished.

2. By using commercially available calcined magnesite in a 35% proportion as a source of magnesium oxide, the precise chemical composition is known and the amount of copper and silica fume may be adjusted to combine with the available calcium oxide to form an insoluble void filling compound.

3. The addition of silica fume and polysiloxane coated calcium hydroxide in proportion to the amount of calcium oxide is effective in quadrupling water resistance as opposed to the addition of cuprous oxide alone. Silica fume is a by-product resulting from the reduction of high purity quartz with coal in electric arc furnaces in the manufacture of ferro silicon and silicon metal. The condensed fume consists of very fine spherical particles with an average diameter of .1 $\mu$m. Silica fume meets the definition of a pozzolan as a siliceous material which in itself possesses little or no cementitious value but will, in finely divided form and in the presence of moisture, chemically react with calcium hydroxide at ordinary temperatures to form compounds possessing cementitious products. Since analytical calcium oxide is available not only from the calcined magnesite but also from the dolomitic limestone in the presence of water, the volatilized silica is to be considered both pozzolanic and cementitious. The presence of the calcium silica hydrate thus formed reduces the permeability of the cement and increases its strength. The microscopic size of the silica fume, 60 to 80 times smaller than the finely divided copper, allows it to physically fill the voids between cement particles, providing a denser and stronger hardened cement. Filling voids and capillaries in the cement through utilization of silica fume and copper powder greatly reduces the permeability of the cement. This effectively stops the intrusion of weak concentrations of lactic and acetic acids which are commonly present in foodservice operations wherein this new cupric oxychloride cement is being used. The use of silica fume allows a reduction in the amount of necessary copper which results in a significant cost savings.

4. Introducing an oxide of copper that is a U.S. Environmental Protection Agency registered pesticide provides not only the pozzolanic and cementitious value as discussed but also renders the cement flooring toxic to certain microorganisms and substantially repellent to roaches. Red Copp 97N (EPA pesticide registration #26883-5) is used for this purpose and because the mixed and hardened cement flooring is homogeneous, this capacity endures throughout the life cycle of the cement.

Accordingly, the present invention is a cementitious material having resistance to water that includes a cement flooring containing silica fume, copper and polysiloxane coated calcium hydroxide. In addition, the present invention is a cupric oxychlroide cementitious material which possesses increased strength and increased resistance to deteriorating processes due to the presence of an insoluble void filling compound that includes silica fume, copper and polysiloxane coated calcium hydroxide. Futhermore, the present invention is a cupric oxychloride cementitious material having improved resistance to water, increased strength, increased resistance to deteriorating processes and which is toxic to microorganisms and repelent to roach species, with the material including on a dry mix basis in percentage weight, about 2% to 5% copper oxide, about 1% to 5% condensed silica fume, about 1.5% siloxane coated calcium hydroxide, about 53.5% to 60.5% dolomitic limestone and pigments and fillers. Further details and advantages of the present invention are set forth hereinafter.

The inventor conducted various experiments to demonstrate the effectiveness of the presently claimed invention. The results of these experiments are as follows:

Testing of cupric oxychloride cement water absorption is summarized in the following Tables. TA.-1. TB.-1 and TC.-1 for various specimens containing cuprous oxide:

TESTING OF CUPRIC OXYCHLORIDE CEMENT
WATER ABSORPTION
ASTM C67-92A. SECTION 7.3
24 HOUR IMMERSION IN WATER AT 70 + 3° F.

TA.-1 Specimens Containing 5% Cuprous Oxide

|    | Dried Weight | Final Weight | Weight Gain | % Water Absorption |
|----|----|----|----|----|
| 1. | 188.43 g. | 206.73 g. | 18.30 g. | 9.71% |
| 2. | 196.50 g. | 215.85 g. | 19.35 g. | 9.85% |
| 3. | 181.29 g. | 199.72 g. | 18.43 g. | 10.17% |
| 4. | 245.41 g. | 271.39 g. | 25.98 g. | 10.59% |
| 5. | 259.48 g. | 287.12 g. | 27.64 g. | 10.65% |
|    |           |           | Average: | 10.19% |

TB.-1 Specimens Containing 2% Cuprous Oxide

|     | Amount of Silica Fume | % Water Absorption |
|-----|----|----|
| 1.  | .5%  | 5.79% |
| 2.  | 1.0% | 5.23% |
| 3.  | 1.5% | 5.29% |
| 4.  | 2.0% | 4.93% |
| 5.  | 2.5% | 4.85% |
| 6.  | 3.0% | 4.30% |
| 7.  | 3.5% | 4.65% |
| 8.  | 4.0% | 5.43% |
| 9.  | 4.5% | 4.25% |
| 10. | 5.0% | 4.85% |

TC.-1 Specimens Containing 2% Cuprous Oxide, 2.5% Silica Fume and 1.5% Polysiloxane-Coated Calcium Hydroxide

|    | Dried Weight | Final Weight | Weight Gain | % Water Absorption |
|----|----|----|----|----|
| 1. | 197.82 g. | 201.97 g. | 4.15 g. | 2.10% |
| 2. | 184.36 g. | 189.41 g. | 5.05 g. | 2.73% |
| 3. | 179.41 g. | 184.43 g. | 5.02 g. | 2.79% |
| 4. | 206.80 g. | 211.76 g. | 4.96 g. | 2.39% |
| 5. | 192.27 g. | 197.97 g. | 5.70 g. | 2.96% |
|    |           |           | Average: | 2.59% |

The results set forth in Tables TA.-1. TB.-1 and TC.-1 were compiled using the following procedure. The dry, cooled specimen was weighed. The specimen. without preliminary partial immersion, was then submerged in clean water (soft. distilled or rain water) at 60 to 86° F. (15.5 to 30° C.) for the specified time period. The specimen was then removed from the water and the excess surface water was removed. The specimen was then weighed within five minutes of removal from the bath. The absorption of each specimen was then calculated as follows:

Absorption, % = 100 $(W_s - W_d)/W_d$
where:
$W_d$ = dry weight of the specimen, and
$W_s$ = saturated weight of the specimen after submersion in cold water.

TESTING OF THE EFFECT OF THE INVENTION ON MICROORGANISMS AND ROACHES

The testing of the composition of the present invention was found to possess the advantages of being toxic to microorganisms and a repellent to cockroaches.

The known bactericidal and fungicidal properties of certain of the copper compounds suggested that the new cupric oxychloride cement might possess inhibitory or destructive powers against microorganisms. A study was undertaken to obtain further quantitative data on the influence of this cement on the growth of microorganisms. Such an influence may be significant in connection with practical uses for the cement which inhibitory or destructive powers suggest, such as floor surfacing in locker rooms and showers, around swimming pools, in certain food industries, and in similar places where sanitation is of paramount importance.

Based upon this testing, it was confirmed that:

1. The growth of molds was markedly inhibited after contact with cupric oxychloride cement.
2. The growth of bacteria was inhibited by a longer time exposure and to a less marked degree.
3. The toxic properties of this cement were found to be retained after washing for six (6) hours in running water.

Tests were also performed to determine if repellency of roaches could be demonstrated.

In summary, Hubbellite shows a marked degree of repellency against the German, American, and Oriental Roaches. These results will be of interest in the consideration of Hubbellite as a flooring, especially for rooms or buildings for food storing, selling and servicing.

Having thus described the invention, what is claimed is:

1. A cupric oxychloride cementitious material which possesses increased strength and increased resistance to deteriorating processes due to the presence of an insoluble void filling compound comprising 1 wt. % to 5 wt. % silica fume, 2 wt. % to 5 wt. % copper oxide, about 1.5 wt. % polysiloxane coated calcium hydroxide, about 35 wt. % calcinated magnesite, about 53.5 wt. % to 60.5 wt. % dolomitic limestone and pigments and fillers.

2. A cupric oxychloride cementitious material having improved resistance to water, increased strength, increased resistance to deteriorating processes and which is toxic to microorganisms and repellent to roach species, said material comprising on a dry mix basis about 2 wt. % to 5 wt. % copper oxide, about 1 wt. % to 5 wt. % condensed silica fume, about 1.5 wt. % siloxane coated calcium hydroxide, about 35 wt. % calcinated magnesite, about 53.5 wt. % to 60.5 wt. % dolomitic limestone and pigments and fillers.

* * * * *

UNITED STATES PATENT AND TRADEMARK OFFICE
CERTIFICATE OF CORRECTION

PATENT NO. : 6,159,280  
DATED : December 12, 2000  
INVENTOR(S) : William V. Ryan Page 1 of 4

It is certified that error appears in the above-indentified patent and that said Letters Patent is hereby corrected as shown below:

Column 1, Line 60, after "60.5" insert --wt.--.

Column 2, Line 4, after "35" insert --wt.--.

Column 2, Line 5, after "2" insert --wt.--.

Column 2, Line 5, after "5" insert --wt.--.

Column 2, Line 5, after "1" insert --wt.--.

Column 2, Line 5, after "5" insert --wt.--.

Column 2, Line 6, after "1.5" insert --wt.--.

Column 2, Line 7, after "53.5" insert --wt.--.

Column 2, Line 7, after "60.5" insert --wt.--.

Column 2, Line 15, after "35" insert --wt.--.

Column 3, Line 12, after "2" insert --wt.--.

Column 3, Line 12, after "5" insert --wt.--.

UNITED STATES PATENT AND TRADEMARK OFFICE
CERTIFICATE OF CORRECTION

PATENT NO. : 6,159,280
DATED : December 12, 2000
INVENTOR(S) : William V. Ryan

It is certified that error appears in the above-identified patent and that said Letters Patent is hereby corrected as shown below:

Column 1, Line 47, "fmely" should read --finely--.

Column 1, Line 57, after "35" insert --wt.--.

Column 1, Line 58, after "2" insert --wt.--.

Column 1, Line 58, after "5" insert --wt.--.

Column 1, Line 58, after "1" insert --wt.--.

Column 1, Line 58, after "5" insert --wt.--.

Column 1, Line 59, after "1.5" insert --wt.--.

Column 1, Line 60, after "53.5" insert --wt.--.

UNITED STATES PATENT AND TRADEMARK OFFICE
CERTIFICATE OF CORRECTION

PATENT NO. : 6,159,280
DATED : December 12, 2000
INVENTOR(S) : William V. Ryan

It is certified that error appears in the above-identified patent and that said Letters Patent is hereby corrected as shown below:

Column 3, Line 12, after "1" insert --wt.--.

Column 3, Line 12, after "5" insert --wt.--.

Column 3, Line 13, after "1.5" insert --wt.--.

Column 3, Line 14, after "53.5" insert --wt.--.

Column 3, Line 14, after "60.5" insert --wt.--.

Column 3, Line 30, after "5" insert --wt.--.

Column 3, Line 40, after "2" insert --wt.--.

Column 3, Line 51, after "2" insert --wt.--.

Column 3, Line 51, after "2.5" insert --wt.--.

UNITED STATES PATENT AND TRADEMARK OFFICE
CERTIFICATE OF CORRECTION

PATENT NO. : 6,159,280
DATED : December 12, 2000
INVENTOR(S) : William V. Ryan

It is certified that error appears in the above-indentified patent and that said Letters Patent is hereby corrected as shown below:

Column 3, Line 52, after "1.5" insert --wt.--.

Signed and Sealed this

Eighth Day of May, 2001

Attest:

NICHOLAS P. GODICI

*Attesting Officer*   *Acting Director of the United States Patent and Trademark Office*